Oct. 19, 1971      E. M. REDDING      3,613,174

APPARATUS FOR PRODUCING MOLDED PRINTING PLATES

Filed Jan. 9, 1969      2 Sheets-Sheet 1

INVENTOR
EDWARD M. REDDING

By Dicke, Zarley, McKee & Thomte

ATTORNEYS

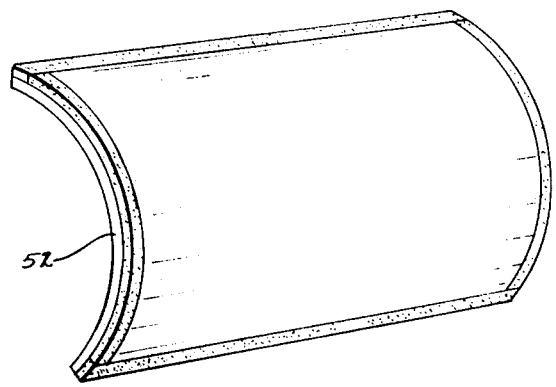
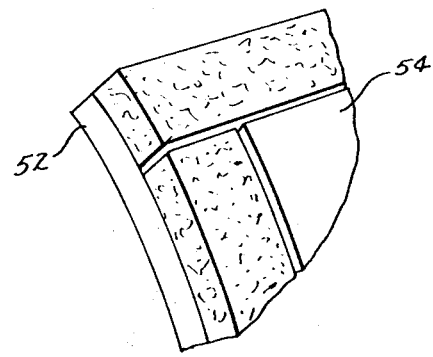
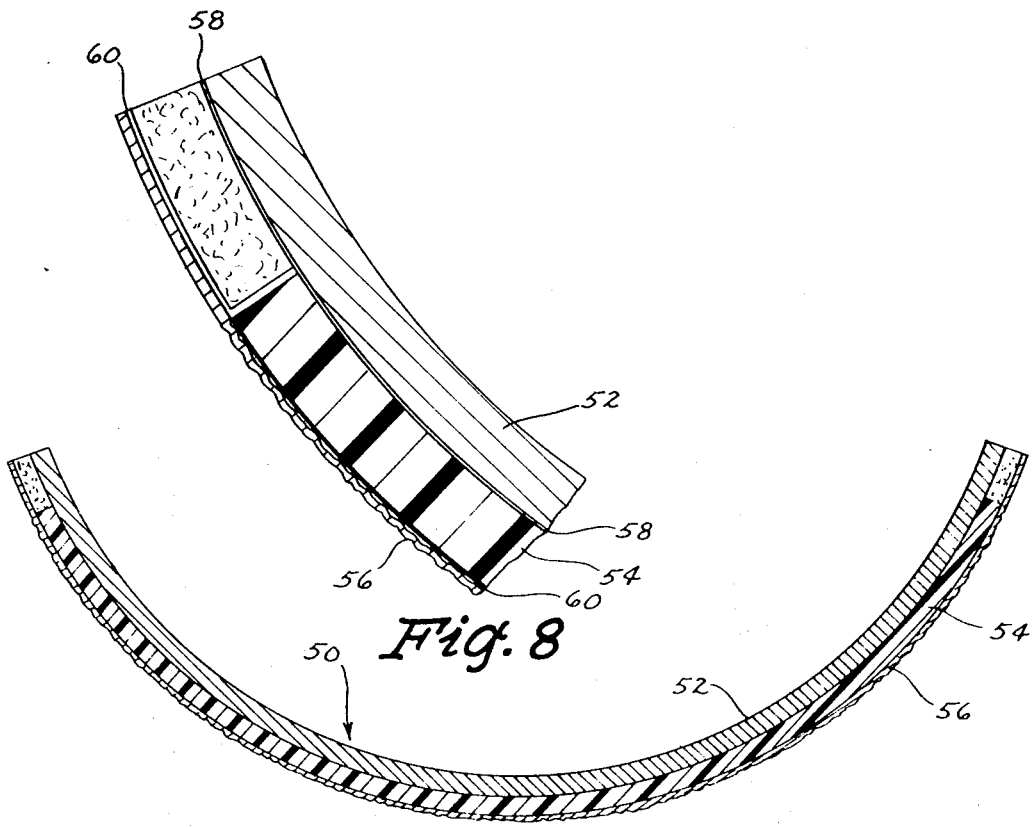

United States Patent Office 3,613,174
Patented Oct. 19, 1971

3,613,174
APPARATUS FOR PRODUCING MOLDED PRINTING PLATES
Edward M. Redding, Algonquin, Ill., assignor to Printing Plate Supply Co., Chicago, Ill.
Continuation-in-part of application Ser. No. 580,393, Sept. 19, 1966, now Patent No. 3,427,970. This application Jan. 9, 1969, Ser. No. 790,031
Int. Cl. B29c *3/00, 17/00*
U.S. Cl. 18—19 R        8 Claims

ABSTRACT OF THE DISCLOSURE

The method of placing plate material including a layer of plastic between at least a first pair of heated dies under pressure, and the repeating of said first step in a second pair of dies under pressure, wherein bearers of greater thickness are used to limit closing of said first pair of dies than bearers used to limit the closing of said second pair of dies.

RELATED U.S. APPLICATION

This application is a continuation-in-part of copending application Ser. No. 580,393 filed Sept. 19, 1966 now Pat. No. 3,427,970.

A printing plate having a backing sheet of metal with a printing shell sandwiching therebetween a sheet of plastic frequently requires a boring operation after the assembly or sandwich has been completely assembled to give it the desired thickness uniformly throughout its area. This boring operation requires substantial time and the cost is considerable.

The method and machine of this invention will produce a printing plate which may not require boring and has a thickness with 0.004 inch of the desired thickness from edge to edge. This is accomplished by laminating the sandwich of materials in a die having solid half sections with die separation bearers which will successively permit the die sections to move closer together as the printing plate sandwich moves from the preheat stage to the molding stage and finally to the cooling stage of construction. The die halves of the cooling die in particular have guide members which rigidly control the movement of the dies back and forth to prevent any lateral movement therebetween and thus assist in producing a printing plate of uniform thickness. A minimum pressure on the sandwich assembly is maintained during most of each cycle of operation since the thickness of the steel bearers, the temperature of the die and the die pressure are coordinated so that the steel bearers on one die half do not close against the opposite die half until nearly the end of the heating or chilling cycle. The minimizing of the period in which there is high pressure on the printing plate sandwich minimizes tendency of the hot plastic to flow and relieve itself of pressure, which in turn would cause a poor surface on the electrotype face and a variation in the printing plate thickness.

The metal bearers contemplated by this invention preferably decrease in thickness 0.010 to 0.015 inch per stop from the hot stations down to the desired thickness of the resulting printing plate at the cooling station.

These and other purposes of this invention will be apparent to those skilled in the art.

This invention also consists in the construction, arrangements, and combination of the various parts of the machine and plate assembly, whereby the objects contemplated are attained as hereinafter more fully set forth, specifically pointed out in the claims, and illustrated in the accompanying drawings in which:

FIG. 6 is a perspective view of the completed printing plate assembly;

FIG. 7 is an enlarged perspective view of one corner of the printing plate of FIG. 6;

FIG. 8 is a fragmentary cross-sectional view of the assembled printing plate including the printing shell; and FIG. 9 is a cross-sectional view of a completed printing plate.

Figure 1:
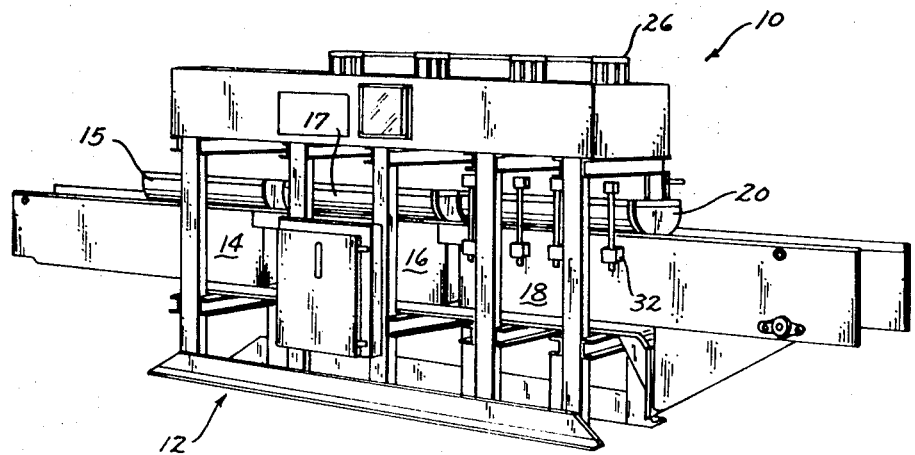
FIG. 1 is a perspective view of the plate maker machine.

The printing plate forming machine of this invention is referrred to generally in FIG. 1 by the reference numeral 10. It is provided with a supporting frame 12 having a preheating die 14, a molding die 16, and a cooling die 18. These dies are arranged in alignment such that a printing plate package may be placed in the preheat die 14 and moved by a cable or the like (not shown) successively through the dies towards the right end.

Figure 2:
FIG. 2 is an end view of the machine in FIG. 1 as viewed from the right.
Figure 3:
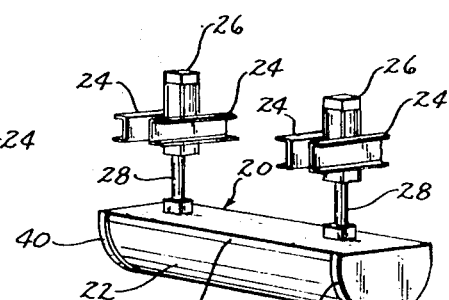
FIG. 3 is a perspective view of the movable die half.
Figure 4:
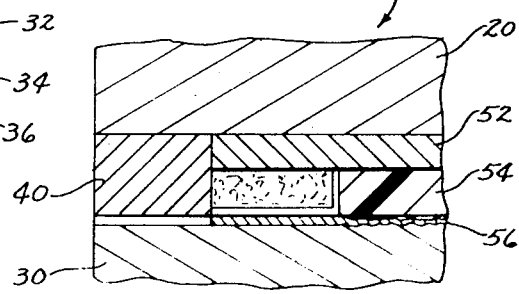
FIG. 4 is a fragmentary cross-sectional view taken along line 4—4 in FIG. 2.
Figure 5:
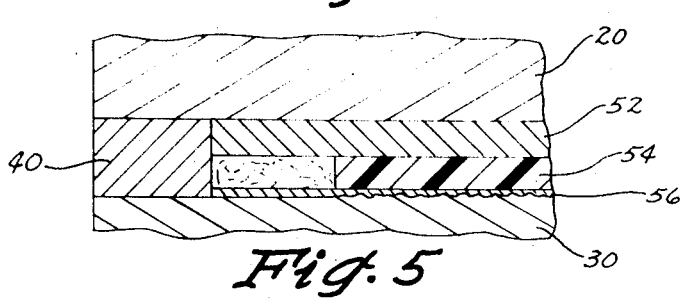
FIG. 5 is a fragmentary cross-sectional view similar to FIG. 4 but showing the printing plate package completed and still in the cooling die.

As shown in FIGS. 1 and 3, each of the dies include a movable upper die half 15, 17 and 20 respectively having a solid convex outer face 22. The upper die halves are movably supported by two pairs of oppositely facing channel members 24. A pair of hydraulic cylinders 26 are connected to the channels 24 and to each die half through the cylinder piston rods 28. The bottom half of each die is provided with a concave die half for matingly receiving the upper movable convex die half. In FIG. 2 it is seen that the cooling die 18 has a bottom stationary die 30 for receiving the movable upper die half 20.

The last operation performed on the printing plate package is the most critical and thus extra precaution has been taken to assure that there is no lateral movement of the movable die 20 as it moves towards and away from the bottom die half 30. Accordingly, three guide units 32 are provided on each side of the die to maintain the straight vertical movement of the movable die 20. The guide units 32 include a guide sleeve 34 secured to the side of the bottom die half 30 and a guide shaft 36 movably mounted in the sleeve 34 and rigidly connected to a laterally outwardly extending arm 38 connected to the upper movable die half 20.

As seen in FIG. 3, the die half 20 includes on its outer convex surface metal bearer limiting elements. These bearer elements are positioned at the peripheral edges of the convex surface and thus include two semi-circular elements 40 at opposite ends of movable die 20 and longitudinally extending bearer elements 42 positioned between the end elements 40 along the top edge of die surface 22. The thickness of the bearer elements on the cooling die are substantially equal to the thickness of the desired completed printing plate while the thickness of the molding die bearer elements are relatively thicker and the preheat die bearer elements are additionally thicker. For example, a three die station machine may have a cold stage die with bearer elements having a thickness of 0.240 inch, molding stage die with bearer elements having a thickness of 0.255 inch and a preheat die bearer elements with a thickness of 0.270 inch. Stated another way, the molding die bearer elements are 6.25% larger than the cooling die bearer elements while the preheating die bearer elements are 12.05% thicker than the cooling die bearer elements.

In FIGS. 6, 7, 8 and 9, the printing plate assembly is shown in various stages of construction and is referred to in its completed form by the reference numeral 50 in FIG. 9. It includes a metal backing plate 52 having a sheet of plastic 54 such as polyvinyl chloride secured on its convex face and covered by a printing shell 56. These components are shown in FIG. 8 being secured together by adhesive 58 and 60.

In operation, the printing plate package is placed between the die halves in the preheat die 14 which is within a temperature range of 250 to 400° F., and preferably at a temperature of 325° F. A pressure of one to five pounds per square inch is applied to the package for 4½ minutes. Next, the printing plate package is moved to the molding die 16 which is also set between 250 to 400° F. and preferably at 325° F. and is submitted to one to five pounds per square inch pressure for over 3½ minutes. Then the pressure is increased to between 30 and 150 pounds per square inch during a time interval of less than one minute. Finally, the printing plate package is placed in the cooling die at between 40° to 125° F., and preferably at 60° F. where it is subjected to 30 to 150 pounds per square inch pressure for the full cycle period. It is important maintain some pressure on the back of the printing plate during most of the cycle of each operation, but the solid movable die head should not close on the steel bearers in the machine early in the heating cycle. It is necessary to avoid having a fairly long period in which there is essentially no pressure on the plate; otherwise, the hot plastic tends to flow and relieve itself of pressure, causing a poor surface on the electrotype face and variation in the thickness. Thus, the die should not bottom out before the last approximately fifteen seconds, and preferably not before the last five seconds, of each operation. In the case of a typical 3½ minute operation in the molding die, the die should not be bottomed out for over say 7% of the operation time and in a 4½ minute operation cycle the end of the cycle when the die is bottomed out should not exceed say 5% of the operation time for that die. Thus, the die is bottomed out approximately between 5 and 7% of the period of each cycle. As previously indicated, the temperatures in the heating stations while preferably are set at 325° F., they could vary from 250 to 400° F. depending on the properties of the plastic and the conditions of operation. The temperature in the cooling station could vary from 40 to 125° F.

From the foregoing, it is seen that the operation at the preheat and molding stations are substantially the same, and while the use of three stations gives the highest machine capacity, the plates described herein could be made with only two stations. Thus, if the bearers at either the preheat or molding stations were of a thickness 0.020 to 0.030 inch greater than the bearers at the cooling station which were at the ultimate desired thickness of the plate, either of the preheat or molding stations could be used for both preheating and molding. This would be accomplished by leaving the plate material in such station for 4 to 9 minutes, with pressure of 1 to 5 pounds per square inch being applied thereto. Pressure of 30 to 150 pounds should be applied within the last minute of the cycle, and preferably within the last few seconds of the cycle. This increased pressure at the end of the cycle helps to insure the adhesion of the plate components to each other as well as to permit the plastic to completely fill all voids in the printing shell. After being preheated and molded at a single station in the manner discussed above, the plate is then moved to the cooling station and is cooled as described in conjunction with the three station operation.

The temperature of the dies may be maintained by placing hot oil therein (not shown). Also, the cooling may be accomplished by the use of a water circulation system which is also not shown.

Thus it is seen that through the use of the disclosed plate maker machine, printing plates having a relatively close thickness tolerance may be produced which may not require boring or shaving along the back side of the aluminum backing plate. It is possible to make these plates with a variation of no more than 0.004 inch thickness, which is in the range that can be accomplished with the use of a boring machine. It is important to have the precision bearers on the dies such that the exact thickness of the printing plate package is provided during each operation. The bearers also help position the movable heads within the lower stationary die halves.

An important advantage of the use of this machine and process over the use of a diaphragm type laminating press, used generally prior to this invention, is that the edges of the laminated plate come out at the same thickness as the rest of the plate. The diaphragm has a tendency to thin out the edges of the plate during lamination, a source of poor quality and/or requiring trimming an inordinate amount of material in order to eliminate the thinner portion.

The complete success of the operation depends upon balancing the flow properties of the plastic against the hot die temperature and the cycle time.

Some changes may be made in the construction and arrangement of my method of producing molded printing plates without departing from the real spirit and purpose of my invention, and it is my intention to cover by my claims, any modified forms of structure or use of mechanical equivalents which may be reasonably included within their scope.

I claim:

1. A die assembly for making printing plates comprising:
   a molding die and a cooling die, each of said molding and cooling dies having a pair of mating solid die halves, one of said die halves having an arcuate convex surface and the other of said die halves having an arcuate concave surface adapted to matingly receive said convex surface;
   a first bearer element on one of said die halves of said molding die; and
   a second bearer element on one of said die halves of said cooling die;
   said first bearer element having a thickness greater than the thickness of said second bearer element;
   said first and second bearer elements being positioned so as to be interposed between said concave and convex surfaces of said molding and cooling dies, respectively.

2. The die assembly of claim 1 wherein a second molding die is positioned adjacent said first-mentioned molding die and said cooling die, said second molding die having mating solid halves with a bearer element on the face of one of said die halves, said bearer element on said second molding die having a thickness greater than the thickness of said bearer element on said first-mentioned molding die and a thickness greater than the bearer element on said cooling die.

3. A die assembly according to claim 1 wherein said molding die includes means for maintaining it at a temperature between 250 degrees and 400° degrees F., and said cooling die includes means for maintaining it at a temperature between 40 degrees and 125 degrees F.

4. A die assembly according to claim 1 comprising means for mounting said molding and cooling dies adjacent one another.

5. A die assembly according to claim 4 wherein said arcuate concave surfaces of said molding and cooling dies are in alignment so as to facilitate sliding movement of said printing plate from said molding die to said cooling die.

6. A die assembly according to claim 1 wherein said first and second bearer elements are arcuate and conform matingly to said concave and convex surfaces of said molding and cooling dies respectively.

7. A die assembly according to claim 1 wherein said first bearer elements have a thickness of .020 to .030 inch greater than said second bearer elements.

8. A die assembly according to claim 7 wherein said molding die includes means for maintaining it at a temperature between 250 degrees and 400 degrees F., and said cooling die includes means for maintaining it at a temperature between 40 degrees and 125 degrees F.

References Cited
UNITED STATES PATENTS

| | | | |
|---|---|---|---|
| 2,781,570 | 2/1957 | Seymour | 18—16 (H)X |
| 2,935,116 | 5/1960 | Drebing | 18—16 (H)X |
| 3,125,952 | 3/1964 | Bungay | 18—16 (H)X |
| 3,161,911 | 12/1964 | Mathews | 18—16 (H)X |

ROBERT L. SPICER, JR., Primary Examiner

U.S. Cl. X.R.

18—16 E, 17 H